US008178168B2

(12) United States Patent
O'Neill et al.

(10) Patent No.: US 8,178,168 B2
(45) Date of Patent: May 15, 2012

(54) METHOD FOR COATING A SUBSTRATE USING PLASMA

(75) Inventors: Liam O'Neill, Midleton (IE); Lesley Ann O'Hare, Cork City (IE); Andrew James Goodwin, Rochestown (IE)

(73) Assignee: Dow Corning Ireland Limited, Midleton, Co. Cork (IE)

( * ) Notice: Subject to any disclaimer, the term of this patent is extended or adjusted under 35 U.S.C. 154(b) by 662 days.

(21) Appl. No.: 11/577,914

(22) PCT Filed: Oct. 12, 2005

(86) PCT No.: PCT/GB2005/003929

§ 371 (c)(1), (2), (4) Date: Apr. 15, 2009

(87) PCT Pub. No.: WO2006/046003

PCT Pub. Date: May 4, 2006

(65) Prior Publication Data

US 2009/0202739 A1 Aug. 13, 2009

(30) Foreign Application Priority Data

Oct. 26, 2004 (GB) .................................. 0423685.7

(51) Int. Cl.
*C08J 7/16* (2006.01)

(52) U.S. Cl. ........ 427/487; 427/488; 427/533; 427/535; 427/569

(58) Field of Classification Search .................. 252/500; 727/487, 488, 533, 535, 569
See application file for complete search history.

(56) References Cited

U.S. PATENT DOCUMENTS

| | | | | |
|---|---|---|---|---|
| 3,962,486 | A * | 6/1976 | Gerek et al. | 427/447 |
| 5,064,802 | A | 11/1991 | Stevens et al. | |
| 5,198,401 | A | 3/1993 | Turner et al. | |
| 5,324,800 | A | 6/1994 | Welborn, Jr. et al. | |
| 5,807,615 | A | 9/1998 | Sindzingre et al. | |
| 5,876,753 | A | 3/1999 | Timmons et al. | |
| 6,207,239 | B1 | 3/2001 | Affinito | |
| 6,228,436 | B1 | 5/2001 | Affinito | |
| 6,262,523 | B1 | 7/2001 | Selwyn et al. | |

FOREIGN PATENT DOCUMENTS

| | | | |
|---|---|---|---|
| EP | 0049884 | A1 | 4/1981 |
| EP | 0095974 | B1 | 12/1983 |
| EP | 0896035 | A2 | 2/1999 |
| EP | 0822240 | B1 | 9/2002 |
| JP | 63-072705 | | 4/1988 |
| JP | 63-072705 | A | 4/1988 |
| JP | 05-309131 | | 11/1993 |
| JP | 2002532575 | A | 10/2002 |
| JP | 2002532576 | A | 10/2002 |
| WO | WO 97/38801 | | 10/1997 |
| WO | WO 00/20130 | | 4/2000 |
| WO | WO 00/34341 | | 6/2000 |
| WO | WO 02/28548 | A2 | 4/2002 |
| WO | WO 02/35576 | A1 | 5/2002 |
| WO | WO 03/084682 | A1 | 10/2003 |
| WO | WO 03/085693 | A1 | 10/2003 |
| WO | WO 03/086031 | A1 | 10/2003 |
| WO | WO 03/089479 | A2 | 10/2003 |
| WO | WO 03084682 | A1 * | 10/2003 |
| WO | WO 2004/068916 | A1 | 8/2004 |
| WO | WO 2005/039753 | A1 | 5/2005 |

OTHER PUBLICATIONS

English language abstract for EP 0095974 extracted from esp@cenet.com, Jun. 3, 2008.
Kanazawa et al., "Stable Glow Plasma at Atmospheric Pressure", Phys D: Appl. Phys. No. 21, 1988 pp. 838-840.
Chen et al., "Pulsed Plasma Polymerization of Tetramethyltin: Nanoscale Compositional Control of Film Chemistry", Chem. Mater., No. 8, 1996 pp. 1067-1077.
Chilkoti et al., "Plasma-Deposited Polymeric Films Prepared from Carbonyl-Containing Volatile Precursors . . . ", Chem. Mater. No. 3, 1991, pp. 51-61.
Paul et al., "Initiation of Methyl Methacrylate Polymerization by the Nonvolatile Products of . . . " Macromolecules, No. 18, 1985, pp. 2312-2318.
Hill et al., "Properties of Oxidized Silicon as Determined by Angular-Dependent . . . ", Chemical Physics Letters, vol. 44, No. 2, 1976, pp. 225-231.
Alexander et al., "The Chemistry of Deposits Formed from Acrylic Acid Plasmas", Journal of Materials Chemistry, No. 8(4), 1998, pp. 937-943.
Murthy et al. "Initiation of Cyclic Vinylmethylsiloxane Polymerization in Hot-Filament . . . ", Langmuir, vol. 18, No. 16, 2002, pp. 6424-6428.
Coulson, et al. "Plasmachemical Functionalization of Solid Surfaces with Low Surface . . . " Langmuir, vol. 16, No. 15, 2000, pp. 6287-6293.
Ryan et al., Pulsed Plasma Polymerization fo Maleic Anhydride:, Chem. Mater. vol. 8, No. 1, 1996, pp. 37-42.
Kogelschatz, "Filamentary, Patterned, and Diffuse Barrier Discharges", IEEE Trans Plasma Science vol. 30, No. 4, 2002, pp. 1400-1408.
Kanazawa et al., "Glow Plasma Treatment at Atmospheric Pressure for Surface Modification and Film Deposition", Nuclear Instruments and Methods in Physics Research B37/38, 1989, pp. 842-845.

(Continued)

*Primary Examiner* — Eisa Elhilo
(74) *Attorney, Agent, or Firm* — Howard & Howard Attorneys PLLC

(57) ABSTRACT

A method for forming a polymeric coating on a substrate surface, by plasma treating a mixture comprising a free-radical initiated polymerisable monomer having one or more free-radical polymerisable groups in the presence of a free radical initiator, wherein said plasma treatment is a soft ionisation plasma process (a process wherein precursor molecules are not fragmented during the plasma process and as a consequence, the resulting polymeric coating has the physical properties of the precursor or bulk polymer) aid depositing the resulting polymeric coating material onto a substrate surface.

12 Claims, 1 Drawing Sheet

OTHER PUBLICATIONS

Pryce Lewis et al., "Hot-Filament Chemical Vapor Deposition of Organosilicon Thin Films from Hexamethylcyclotrisiloxane . . . ", Journal of the Electrochemical Society, vol. 148, No. 12, 2001, pp. F212-F220.

Yokoyama et al., "The Improvement of the Atomospheric Pressure Glow Plasma Method and the Deposition of Organic Films" J. Phys. D: Appl. Phys. No. 23, 1990, pp. 374-377.

Alexander et al., "Trifluoroethanol Derivatization of Carboxylic Acid-containing Polymers for Quantitative XPS Analysis", Surface and Interface Analysis, vol. 24, 1996, pp. 217-220.

Wu et al., "Pulsed Plasma Polymerizations: Film Chemistry Control and Applications" Mat. Res. Soc. Symp. Proc. vol. 544, 1999, pp. 77-87.

Ráhel et al., "The Transition from a Filamentary Dielectric Barrier Discharge to a Diffuse Barrier . . . " Journal of Physics D: Applied Physics, No. 38, 2005, pp. 547-554.

Okazaki et al., "Glow Dischage Plasma at Amtospheric Pressure and its Application", Proc. Jpn. Symp. Plasma Chem. vol. 2, 1989, pp. 95-102.

English language abstract for JP 63-072705 extracted from the espacenet.com database on Nov. 29, 2011. Also, English language translation for JP 63-072705. 14 pages.

English language abstract and translation for JP 05-309131 extracted from the PAJ database on Sep. 6, 2011, 23 pages.

English language abstract for JP 63-072705 extracted from the PAJ database on Sep. 6, 2011, 9 pages.

English language abstract not available for JP 2002532575. However, see English language equivalent US 6228436 extracted from the espacenet.com database on Sep. 6, 2011, 25 pages.

English language abstract not available for JP 2002532576. However, see English language equivalent US 6207239 extracted from the espacenet.com database on Sep. 6, 2011, 28 pages.

* cited by examiner

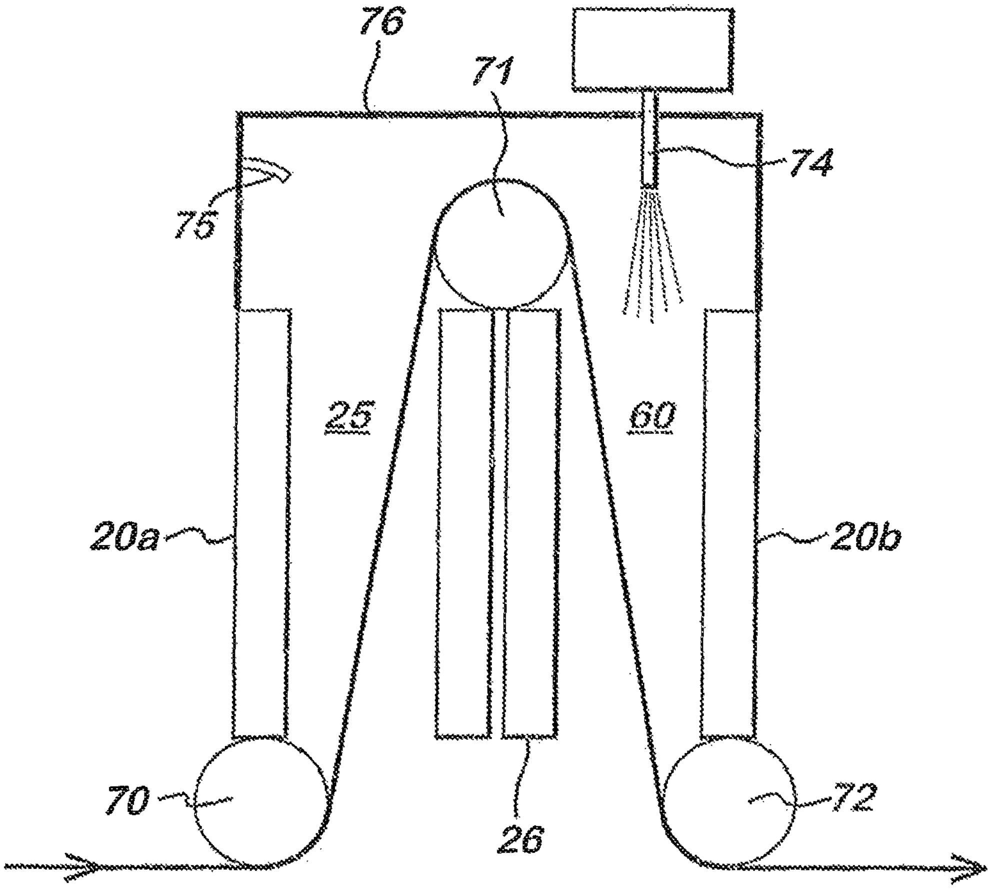
76
71
74
75
25
60
20a
20b
70
26
72

METHOD FOR COATING A SUBSTRATE USING PLASMA

RELATED APPLICATIONS

This application claims priority to and all the advantages of International Patent Application No. PCT/GB2005/003929, filed on Oct. 12, 2005, which claims priority to Great Britain Patent Application No. GB 0423685.7, filed on Oct. 26, 2004.

The present application describes a deposition process for coating substrates with a free-radical polymerised polymeric coating utilizing a combination of plasma technology and catalytically active initiators. The addition of a catalytic agent to the free-radical polymerisable monomers increases the deposition rate. Surprisingly the initiator also increases the degree to which the functionality of the monomer is retained within a plasma polymerised coating subsequent to polymerisation.

Plasma, which is sometimes referred to as the fourth state of matter, is an at least partially ionised gaseous medium, made of excited, unstable and ionised atoms and molecules which emit visible and UV radiation. When matter is continually supplied with energy, its temperature increases and it typically transforms from a solid to a liquid and, then, to a gaseous state. Continuing to supply energy causes the matter to undergo a yet further change of state in which neutral atoms or molecules of the gas are broken up by energetic collisions to produce negatively charged electrons and positive or negatively charged ions. Other species generated in a plasma include high energy non-charged particles such as gas molecules in excited states, metastable compounds, molecular fragments and or radicals. The plasma is electrically neutral and therefore contains positive ions, negative ions and electrons in amounts such that the algebraic sum of their charges is zero. A plasma phase is obtained in the laboratory by subjecting a pure gas or a gaseous mixture to external excitation, which is most generally electrical.

The term "plasma" covers a wide range of systems whose density and temperature vary by many orders of magnitude. Some plasmas, commonly known as thermal equilibrium plasmas are very hot and all their microscopic species (ions, electrons, etc.) are in approximate thermal equilibrium, the energy input into the system being widely distributed through atomic/molecular level collisions; examples include flame based plasmas. Flame based plasmas operate at high gas temperature and are oxidative by nature which means they have significant limitations when applied to deposition processes. In such high temperature gases it is impossible to maintain the chemical structure and/or functionality of the precursor in the deposited coatings. Furthermore, the high process temperatures involved are incompatible with heat sensitive substrates Other plasmas, however, particularly those at low pressure (e.g. 100 Pa) where collisions are relatively infrequent, have their constituent species at widely different temperatures and are called "non-thermal equilibrium" plasmas. In non-thermal equilibrium plasmas, free electrons are very hot with temperatures of many thousands of Kelvin (K) whilst neutral and ionic species remain cool. Because the free electrons have almost negligible mass, the total system heat content is low and the plasma operates close to room temperature thus allowing the processing of temperature sensitive materials, such as plastics or polymers, without imposing a damaging thermal burden. The hot electrons create, through high energy collisions, a rich source of radicals and excited and/or unstable species with a high chemical potential energy capable of profound chemical and physical reactivity. It is this combination of low temperature operation plus high reactivity which makes non-thermal equilibrium plasma technologically important and a very powerful tool for manufacturing and material processing as it is capable of achieving processes which, if achievable at all without plasma, would require very high temperatures or noxious and aggressive chemicals.

The use of plasma polymerisation is well established. Typically, the substrate to be coated is placed within a vessel, and a plasma is formed. Introducing a monomer into this plasma will then give rise to a plasma polymerisation reaction and lead to the deposition of a polymer onto the substrate. Many examples of such treatment are known in the art; for example, U.S. Pat. No. 5,876,753 discloses a process for attaching target materials to a solid surface which process includes affixing carbonaceous compounds to a surface by low power variable duty cycle pulsed plasma deposition, and EP 0896035 discloses a device having a substrate and a coating, wherein the coating is applied to the substrate by plasma polymerisation of a gas comprising at least one organic compound or monomer. Similarly, WO 00/20130 describes a process for depositing a hydrophobic coating onto a solid substrate by exposing the substrate to a plasma containing a suitably substituted alkyne. EP 0095974 describes a process for the polymerisation of pre-prepared supported film which have been applied onto a substrate surface prior to the application of a plasma in a vacuum. Radical initiators may be used in the pre-prepared film as sensitizers. Similarly WO 2003/089479 describes a process in which a composition including both a free-radical polymerisable compound and a photolatent compound, which may be a free-radical photoinitiator, is applied in a liquid form onto a three-dimensional substrate surface and is subsequently plasma treated in a vacuum chamber. Charles W. Paul, Alexis T. Bell and David S. Soong, Macromolecules 1985, 18, 2312-2318, discuss the initiation of methyl methacrylate polymerisation with a free-radical initiator. The free-radical initiator is produced in a vacuum glow discharge process.

Yasuda, H. Plasma Polymerisation; Academic Press: Orlando, 1985 describes how vacuum glow discharge has been used to polymerise gas phase polymer precursors into continuous films. As an example, the plasma enhanced surface treatment and deposition of fluorocarbons has been investigated for the preparation of oleophobic surfaces since the 1970's. Initially, simple fluorocarbon gas precursors such as carbon tetrafluoride were used; this improved hydrophobicity but did not significantly improve oleophobicity. Subsequently, as described in EP 0049884 higher molecular weight fluorinated precursors such as the perfluoroalkyl substituted acrylates were used.

These early processes typically resulted in fragmentation of the precursor and insertion of fluorine into the surface rather than formation of a polymerised fluorocarbon coating. The development of pulsed plasma polymerisation (or modulated discharge) as described in Ryan, M., Hynes, A., Badyal, J., Chem. Mater. 1996, 8(1), 37-42 and Chen, X., Rajeshwar, K., Timmons, R., Chen, J., Chyan, O., Chem. Mater. 1996, 8(5), 1067-77 produced polymerised coatings in which the properties and/or functionalities of the monomer are substantially retained resulting in the production of a polymeric coating retaining many properties of the precursor monomer. Coulson S. R., Woodward I. S., Badyal J. P. S., Brewer S. A., Willis C., Langmuir, 16, 6287-6293, (2000) describe the production of highly oleophobic surfaces using long chain perfluoroacrylate or perfluoroalkene precursors.

WO97/38801 describes a method for the molecular tailoring of surfaces which involves the plasma deposition step being employed to deposit coatings with reactive functional groups, which groups substantially retain their chemical activity on the surface of a solid substrate, using pulsed and continuous wave plasma. Wu et al. discuss in their related publication, Mat. Res. soc. Symp. Proc, vol. 544 pages 77 to 87 the comparison between pulsed and continuous wave plasma for such applications.

Two significant drawbacks exist for such pulsed vacuum plasma methods, firstly the necessity for a vacuum requires the coating process to be operated in a batch wise format, secondly the monomer must be introduced into the plasma as a vapour if the vacuum is to be maintained or the active is coated by conventional means and then in a separate step coated with an encapsulating plasma coating.

One type of plasma is generally referred to as diffuse dielectric barrier discharge (one form of which can be referred to as an atmospheric pressure glow discharge Sherman, D. M. et al, J. Phys. D.; Appl. Phys. 2005, 38 547-554). This term is generally used to cover both glow discharges and dielectric barrier discharges whereby the breakdown of the process gas occurs uniformly across the plasma gap resulting in a homogeneous plasma across the width and length of a plasma chamber. (Kogelschatz, U. 2002 "*Filamentary, patterned, and diffuse barrier discharges*" IEEE Trans. Plasma Sci. 30, 1400-8) These may be generated at both vacuum and atmospheric pressures. In the case of atmospheric pressure diffuse dielectric barrier discharges, gases including helium, argon or nitrogen are utilised as process gases for generating the plasma and a high frequency (e.g. >1 kHz) power supply is used to generate a homogeneous or uniform plasma between the electrodes at atmospheric pressure. The exact mechanism of formation of diffuse DBD is still a matter of debate but there is mounting evidence that Penning ionisation plays a critical role, in combination with secondary electron emission from the cathode surface. (see for example, Kanazawa et al, J. Phys. D: Appl. Phys. 1988, 21, 838, Okazaki et al, Proc. Jpn. Symp. Plasma Chem. 1989, 2, 95, Kanazawa et al, Nuclear Instruments and Methods in Physical Research 1989, B37/38, 842, and Yokoyama et al., J. Phys. D: Appl. Phys. 1990, 23, 374).

Atmospheric pressure plasmas offer industry open port or perimeter systems providing free ingress into and exit from the plasma region by e.g. webbed substrates and, hence, online, continuous processing of large or small area webs or conveyor-carried discrete workpieces. Throughput is high, reinforced by the high species flux obtained from high pressure operation. Many industrial sectors, such as textiles, packaging, paper, medical, automotive, aerospace, etc., rely almost entirely upon continuous, on-line processing so that open port/perimeter configuration plasmas at atmospheric pressure offer a new industrial processing capability.

WO 02/28548 describes a process to overcome the limitations to vacuum and some pulse type applications. By combining an atmospheric pressure plasma discharge, such as a diffuse dielectric barrier discharge, and an atomised precursor, a range of coatings may be deposited which retain the functionality of the precursor to a large degree. Using this technique, a controlled free radical polymerisation takes place and the monomer structure is significantly retained.

Post discharge plasma systems have been developed to produce plasmas using gases passing between adjacent and/(or coaxial) electrodes at high flow rates. These gases pass through the plasma region defined by the shape of the electrodes and exit the system in the form of excited and/or unstable gas mixtures at around atmospheric pressure. These gas mixtures are characterized by being substantially free of electrical charged species, which may be utilized in downstream applications remote from the plasma region, i.e. the gap between the adjacent electrodes in which plasma is generated. This "atmospheric pressure post plasma discharge" (APPPD) has some of the physical characteristics of low pressure glow discharge and APGD including, for example, glow, presence of active light emitting species and chemical reactivity. However, some clear and unique differences exist including the facts that APPPD has higher thermal energy, absence of boundary walls e.g. no electrodes, substantial absence of electrically charged species, large choice of gases and mixture of gases, large flow rate of gases. Systems of this type are described in U.S. Pat. No. 5,807,615, U.S. Pat. No. 6,262,523 and WO 20051039753 which was published after the priority date of the present application.

Hot-Filament Chemical Vapour Deposition (HFCVD) is an alternate method for depositing polymeric coatings on substrates which, unlike plasma enhanced Chemical Vapour Deposition (PECVD), does not use a plasma to initiate a free radical based CVD process but uses a heated filament to initiate a thermal CVD reaction. Recent work using HFCVD has shown that the addition of free radical initiators to a monomer vapour can result in increased retention of the monomer functionality in the resulting polymerised coating (Gleason et al, Langmuir, 2002, 18, 6424, and Gleason et al, J. Electrochem. Soc., 2001, 148, F212).

The use of catalysts to initiate free-radical polymerisation reactions is a well known and commonly used technique. For example, WO 0034341 describes a heterogeneous catalyst for the polymerisation of olefins. U.S. Pat. Nos. 5,064,802, 5,198,401, and 5,324,800 also describe selective catalysts for olefin polymerisation. U.S. Pat. No. 2,961,245 describes the polymerisation of cyclotrisiloxane containing fluorinated hydrocarbon radicals, in the presence of a homogeneous initiator such as perfluoroalkanesulphonic acid and of linear organosiloxanes with triorganosilyl ends that are used as chain-blocking agents. A fluorinated silicone oil is thus obtained, after devolatilization, whose viscosity is essentially determined by the M2/D 3 ratio. The catalyst is optionally removed by distillation or washing. EP 0822240 describes a coating resin composition formed from an acrylate, organosilane and a curing catalyst.

The present inventors found that, surprisingly, improvements in the retention of functionality of free-radical polymerised polymeric coatings may be achieved by the addition of a free-radical initiator to a free-radical polymerised monomer during plasma deposition processes. Also, the deposition rate of the coatings was found to increase when an initiator was used. The use of initiators is especially applicable in conjunction with liquid precursors and atmospheric pressure plasma techniques such as that described in WO 0228548. The addition of the initiator promotes free radical polymerisation through polymerisable groups within the monomer in preference to the alternative plasma promoted destructive fragmentation reactions which may take place.

According to the present invention there is provided a method for forming a polymeric coating on a substrate surface, which method comprises the steps of i. Plasma treating a mixture comprising a free-radical initiated polymerisable monomer having one or more free-radical polymerisable groups in the presence of a free radical initiator, wherein said plasma treatment is a soft ionisation plasma process; and
ii. depositing the resulting polymeric coating material produced during step (i) onto a substrate surface.

It should be understood that a soft ionisation plasma process is a process wherein precursor molecules are not fragmented during the plasma process and as a consequence, the resulting polymeric coating has the physical properties of the precursor or bulk polymer.

Plasma treatment of the mixture is to be understood to include interaction with ionised and/or excited species both within the plasma or generated as a result of passing through the plasma.

The form of plasma activation utilised may be any suitable type, provided it results in a "soft" ionisation plasma process. Any plasma generating equipment suitable for generating "soft" ionisation plasma may be utilised. Preferably, non-thermal equilibrium plasma equipment may be used. Suitable non-thermal equilibrium plasmas which may be utilised for the present invention include, diffuse dielectric barrier discharges such as atmospheric pressure glow discharge and dielectric barrier discharge (DBD), low pressure glow discharge, so called plasma knife type equipment (as described in WO 03/085693) or post discharge plasma. Preferably, the non-thermal equilibrium plasma equipment may be operated in either continuous mode or pulse mode. Preferred processes are "low temperature" plasmas wherein the term "low temperature" is intended to mean below 200° C., and preferably below 100° C. These are plasmas where collisions are relatively infrequent (when compared to thermal equilibrium plasmas such as flame based systems) which have their constituent species at widely different temperatures (hence the general name "non-thermal equilibrium" plasmas).

Suitable alternative plasma sources may for example comprise, microwave plasma sources, corona discharge sources (where appropriate), arc plasmas sources, DC magnetron discharge sources, helicon discharge sources, capacitatively coupled radio frequency (rf) discharge sources, inductively coupled RF discharge sources, low pressure pulsed plasma sources and/or resonant microwave discharge sources. Corona discharge systems generate locally intense electric fields, i.e. non-uniform electric fields generated using point, edge and/or wire sources. Corona systems have provided industry with an economic and robust means of surface activation for more than 30 years. They typically operate in ambient air resulting in an oxidative deposition environment, which renders control of deposition chemistry difficult. The design of corona systems is such as to generate locally intense plasmas which result in variations in plasma energy density across the plasma chamber. In regions of high energy density the substrate is prone to damage from the plasma whereas in low energy density areas the treatment rate is limited. Attempts to increase the treatment rate in the low energy density areas result in unacceptable levels of substrate or coating damage in the high energy regions. These variations in energy density lead to non-uniform deposition chemistry and/or non-uniform deposition rate across the plasma chamber.

The choice of plasma source will generally be dictated by the dimensions of the substrate, with glow discharge type sources being used for thin films or plates and other more appropriate systems being used for three-dimensional substrates.

Any conventional means for generating an atmospheric pressure plasma or post discharge may be used in the method of the present invention, for example atmospheric pressure diffuse dielectric barrier discharge techniques such as atmospheric pressure plasma jet, atmospheric pressure microwave glow discharge and atmospheric pressure glow discharge. Typically, atmospheric pressure diffuse dielectric barrier discharge (such as glow discharge processes) will employ helium as a process gas and a high frequency (e.g. >1 kHz) power supply to generate a homogeneous plasma (e.g. a homogeneous glow discharge) at atmospheric pressure via, it is believed, a Penning ionisation mechanism.

In the case of low pressure pulsed plasma, the monomers are preferably introduced into the plasma in the form of vapours and polymerisation is initiated by the plasma alone or, when present, in combination with the free radical initiator. The low pressure pulsed plasma may be performed with substrate heating and/or pulsing of the plasma discharge. Whilst for the present invention heating will not generally be required, the substrate may be heated to a temperature substantially as high as its melting point. Substrate heating and plasma treatment may be cyclic, i.e. the substrate is plasma treated with no heating, followed by heating with no plasma treatment, etc., or may be simultaneous, i.e. substrate heating and plasma treatment occur together. The plasma may be generated by any suitable means such as radio frequency, microwave or direct current (DC). A radio frequency generated plasma of 13.56 MHz is preferred. A particularly preferred plasma treatment process involves pulsing the plasma discharge at room temperature or where necessary with constant heating of the substrate. The plasma discharge is pulsed to have a particular "on" time and "off" time, such that a very low average power is applied, for example of less than 10 W and preferably less than 1 W. The on-time is typically from 10 to 10000 μs, preferably 10 to 1000 μs, and the off-time typically from 1000 to 10000 μs, preferably from 1000 to 5000 μs. The gaseous precursors may be introduced into the vacuum with no additional gases; however additional plasma gases such as helium or argon may also be utilized.

Examples of suitable atmospheric pressure diffuse dielectric barrier discharge apparatus (e.g. glow discharge) include the apparatus described in the applicant's co-pending applications WO 02/35576, WO 03/086031 and WO 2004/068916. In WO 02/35576 and WO 03/086031 the plasma is formed using pairs of electrode units. Any suitable electrode units may be used, for example, each electrode unit may contain an electrode and an adjacent a dielectric plate and a cooling liquid distribution system for directing a cooling conductive liquid onto the exterior of the electrode to cover a planar face of the electrode. Each electrode unit may comprise a watertight box having a side formed by a dielectric plate having bonded thereto on the interior of the box the planar electrode together with a liquid inlet and a liquid outlet. The liquid distribution system may comprise a cooler and a recirculation pump and/or a sparge pipe incorporating spray nozzles. WO 2004/068916 describes a number of non-metallic based electrode systems. The atmospheric pressure plasma assembly may also comprise a first and second pair of vertically arrayed parallel spaced-apart planar electrodes with at least one dielectric plate between said first pair, adjacent one electrode and at least one dielectric plate between said second pair adjacent one electrode, the spacing between the dielectric plate and the other dielectric plate or electrode of each of the first and second pairs of electrodes forming a first and second plasma region which assembly further comprises a means of transporting a substrate successively through said first and second plasma regions and is adapted such that said substrate may be subjected to a different plasma treatment in each plasma region.

It should be understood that the term vertical is intended to include substantially vertical and should not be restricted solely to electrodes positioned at 90 degrees to the horizontal.

For typical atmospheric pressure diffuse dielectric barrier discharge generating apparatus (e.g. glow discharge plasma generating apparatus), the plasma is generated within a gap of from 3 to 50 mm, for example 5 to 25 mm. Thus, the method in accordance with the present invention has particular utility for coating films, fibres and powders when using atmospheric pressure glow discharge apparatus. The generation of steady-state glow discharge plasma at atmospheric pressure is preferably obtained between adjacent electrodes which may be spaced up to 5 cm apart, dependent on the process gas used. The electrodes being radio frequency energised with a root mean square (rms) potential of 1 to 100 kV, preferably between 4 and 30 kV at 1 to 100 kHz, preferably at 15 to 40 kHz. The voltage used to form the plasma will typically be between 2.5 and 30 kV, most preferably between 2.5 and 10 kV however the actual value will depend on the chemistry/gas choice and plasma region size between the electrodes. Each electrode may comprise any suitable geometry and construction. Metal electrodes may be used. The metal electrodes may be in the forms of plates or meshes bonded to the dielectric material either by adhesive or by some application of heat and fusion of the metal of the electrode to the dielectric material. Similarly, the electrode may be encapsulated within the dielectric material.

Whilst the atmospheric pressure diffuse dielectric barrier discharge (e.g. glow discharge) assembly may operate at any suitable temperature, it preferably will operate at a temperature between room temperature (20° C.) and 70° C. and is typically utilized at a temperature in the region of 30 to 50° C.

When using an atmospheric pressure diffuse dielectric barrier discharge assembly such as an atmospheric pressure glow discharge system the polymerisable monomers and initiators may be introduced into an atmospheric pressure glow discharge plasma as a vapour by conventional means, or as an atomised liquid. Monomers are preferably supplied to the relevant plasma region after having been atomised. When in liquid form, the coating-forming material may be atomised using any suitable atomiser. Preferred atomisers include, for example, ultrasonic nozzles, i.e. pneumatic or vibratory atomisers in which energy is imparted at high frequency to the liquid. The vibratory atomisers may use an electromagnetic or piezoelectric transducer for transmitting high frequency oscillations to the liquid stream discharged through an orifice. These tend to create substantially uniform droplets whose size is a function of the frequency of oscillation. The material to be atomised is preferably in the form of a liquid, a solid or a liquid/solid slurry. The atomiser preferably produces a coating-forming material drop size of from 10 to 100 μm, more preferably from 10 to 50 μm. Suitable ultrasonic nozzles which may be used include ultrasonic nozzles from Sono-Tek Corporation, Milton, N.Y., USA or Lechler GmbH of Metzingen Germany. Other suitable atomisers which may be utilised include gas atomising nozzles, pneumatic atomisers, pressure atomisers and the like. The apparatus of the present invention may include a plurality of atomisers, which may be of particular utility, for example, where the apparatus is to be used to form a copolymer coating on a substrate from two different coating-forming materials, where the monomers are immiscible or are in different phases, e.g. the first is a solid and the second is a gas or liquid. In a still further embodiment the free radical initiator and the monomer may be separately plasma treated (i.e. directed through separate plasma regions prior to inter-mixing and application onto a substrate). In which case the initiator and the monomer will require separate atomisers.

An advantage of using an atmospheric pressure diffuse dielectric barrier discharge assembly e.g. an atmospheric pressure glow discharge assembly) for the plasma treating step of the present invention as compared with the prior art is that both liquid and solid atomised polymerisable monomers may be used to form substrate coatings, due to the method of the present invention taking place under conditions of atmospheric pressure. Furthermore, the polymerisable monomers can be introduced into the plasma discharge or resulting stream in the absence of a carrier gas, i.e. they can be introduced directly by, for example, direct injection, whereby the monomers are injected directly into the plasma.

Preferably, deposition of the coating occurs whilst the substrate is in the plasma activation region.

The process gas for use in either preferred plasma treatment of the method in accordance with the present invention may be any suitable gas but is preferably an inert gas or inert gas based mixture such as, for example helium, a mixture of helium and argon and an argon based mixture additionally containing ketones and/or related compounds. These process gases may be utilized alone or in combination with potentially reactive gases such as, for example, nitrogen, ammonia, $O_2$, $H_2O$, $NO_2$, air or hydrogen. Most preferably, the process gas will be Helium alone or in combination with an oxidizing or reducing gas. The selection of gas depends upon the plasma processes to be undertaken. When an oxidizing or reducing process gas is required, it will preferably be utilized in a mixture comprising 90-99% inert or noble gas and 1 to 10% oxidizing or reducing gas.

The duration of the plasma treatment will depend upon the particular substrate and application in question.

Preferably, where the method of the present invention utilises an atmospheric plasma glow discharge plasma assembly, the means of transporting a substrate is a reel to reel based process. Preferably in such a case the substrate may be coated on a continuous basis by being transported through an atmospheric plasma glow discharge by way of a reel to reel based process in which the substrate travels from a first reel, through a the plasma region and on to a second reel at a constant speed to ensure that all the substrate has a predetermined residence time within the respective plasma regions. The residence time in the plasma region may be predetermined prior to coating and rather than varying the speed of the substrate the length of the plasma region may be varied. The assembly may additionally comprise one or more pairs of typically vertical parallel orientated electrodes situated before or after the pair of electrodes in the first plasma zone.

Optionally where required the substrate may be cleaned and/or activated prior to or after coating, using plasma generated from a suitable gas such as helium, nitrogen, oxygen, argon or air. Preferably said cleaning and/or activation step will be carried out by subjecting the substrate to exposure to a plasma treatment using the pair of parallel orientated electrodes situated before or after the plasma zone in which the coating is applied to the substrate. Preferably, the cleaning and/or activating step takes place prior to coating the substrate. Further treatments applied in additional plasma regions formed by the additional pairs of electrodes may be the same or different from that undertaken in the plasma regions described above. In the case when additional plasma regions are provided for pre-treatment or post-treatment the necessary number of guides and/or rollers will be provided in order to ensure the passage of the substrate through the assembly. Similarly preferably the substrate will be transported alternatively upwardly and downwardly through all neighbouring plasma regions in the assembly.

In the case when further plasma regions are provided after the first and second plasma regions said additional plasma regions may, further activate the surface, or apply a coating or might be utilised to activate the coated surface and then recoat the surface, apply one or more further coatings or the like, dependent on the application for which the substrate is intended.

Any appropriate combination of plasma treatments may be used, for example the substrate may be initially plasma cleaned and/or activated using a helium gas plasma and then has a coating applied, for example, by application of a liquid or solid spray through an atomiser or nebuliser as described in the applicants co-pending application WO 02/28548.

Alternatively the substrate may be first oxidised (in for example, an oxygen/Helium process gas) prior to coating.

Any suitable polymerisable group(s) may be contained in the free-radical initiated polymerisable monomer used in the method of the present. Preferably, each monomer comprises at least one unsaturated group such as a linear or branched alkenyl group e.g. vinyl, propenyl, hexenyl or an alkynyl group. Most preferably the monomer also comprises at least one other type of functional group which is not polymerised via a free radical polymerisation process, such groups may include, alcohol groups, carboxylic acid groups, carboxylic acid derivative groups such as aldehydes and ketones, esters, acid anhydrides, maleates, amides and the like, primary secondary or tertiary amino groups, alkyl halide groups, carbamate groups, urethane groups, glycidyl and epoxy groups, glycol and polyglycol groups, organic salts, organic groups containing boron atoms, phosphorus containing groups such as phosphonates, and sulphur containing groups such as mercapto, sulphido, sulphone and sulphonate groups, and grafted or covalently bonded biochemical groups such as amino acids and/or their derivatives, grafted or covalently bonded biochemical species such as proteins, enzymes and DNA. In view of the fact that the plasma process which takes place is of a "soft ionisation" type, the latter groups are not destroyed and therefore provide functionality to the resulting polymer coating on the substrate surface.

Hence the monomers which may be utilised in the present invention may include methacrylic acid, acrylic acid, alkylacrylic acid, fumaric acid and esters, maleic acid, maleic anhydride, citraconic acid, cinnamic acid, itaconic acid (and esters), vinylphosphonic acid, sorbic acid, mesaconic acid, and, citric acid, succinic acid, ethylenediamine tetracetic acid (EDTA) and ascorbic acid and their derivatives, and/or unsaturated primary or secondary amine, such as for example allyl amine, 2-aminoethylene, 3-aminopropylene, 4-aminobutylene and 5-aminopentylene acrylonitrile, methacrylonitrile, acrylamide, such as N-isopropylacrylamide, methacrylamide, epoxy compounds, for example allylglycidylether, butadiene monoxide, 2-propene-1-ol, 3-allyloxy-1,2,-propanediol, vinylcyclohexene oxide, and phosphorus-containing compounds, for example dimethylvinylphosphonate, diethyl allyl phosphate and diethyl allylphosphonate, vinyl sulphonic acid, phenylvinylsulphonate, vinylsulphone.

Other monomers which may be used include methacrylates, acrylates, diacrylates, dimethacrylates, styrenes, methacrylonitriles, alkenes and dienes, for example methyl methacrylate, ethyl methacrylate, propyl methacrylate, butyl methacrylate, and other alkyl methacrylates, and the corresponding acrylates, including organofunctional methacrylates and acrylates, including glycidyl methacrylate, trimethoxysilyl propyl methacrylate, allyl methacrylate, hydroxyethyl methacrylate, hydroxypropyl methacrylate, dialkylaminoalkyl methacrylates, and fluoroalkyl (meth) acrylates, and styrene, α-methylstyrene, halogenated alkenes, for example, vinylidene halides, vinyl halides, such as vinyl chlorides and vinyl fluorides, and fluorinated alkenes, for example perfluoroalkenes.

Any suitable initiator may be utilised. Examples include, hydrogen peroxide and families of peroxides such as:

i) diacyls, for example benzoyl peroxide; lauroyl peroxide; decanoyl peroxide and 3,3,5-trimethylhexanoyl peroxide;

ii) peroxydicarbonates, for example di-(2-ethylhexyl)peroxydicarbonate;

iii) monoperoxycarbonates, for example poly(tert-butyl peroxycarbonate), and 00-tert-butyl-O-(2-ethylhexyl) monoperoxycarbonate;

iv) peroxyketals, for example ethyl 3,3-di(tert-butylperoxy)butyrate; n-butyl 4,4-di-tert-(tert-butylperoxy)valerate; 2,2-di(tert-butylperoxy)butane; 1,1-di(tert-butylperoxy)cyclohexane and 1,1-di(tert-amylperoxy) cyclohexane;

v) peroxyesters, for example tert-butyl peroxybenzoate; tert-butyl peroxyacetate; tert-butyl peroxy-3,5,5-trimethylhexanoate; tert-amyl peroxy-3,5,5-trimethylhexanoate; tert-butyl peroxyisobutyrate; tert-butyl peroxy 2-ethylhexanoate; tert-butyl peroxypivalate; tert-amyl peroxypivalate; tert-butyl peroxyneodecanoate; tert-amyl peroxyneodecanoate; cumyl peroxyneodecanoate; 3-hydroxy-1,1-di-methylbutylperoxyneodecanoate;

vi) dialkyls, for example 2,5-dimethyl2,5-di(tert-butylperoxy)hexyne; di-tert-butyl peroxide; di-tert-amyl peroxide; 2,5-dimethyl-2,5-di(tert-butylperoxy)hexane; dicumyl peroxide; and vii) hydroperoxides, for example tert-butyl hydroperoxide; tert-amyl hydroperoxide; cumene hydroperoxide; 2,5-dimethyl-2,5-di(hydroperoxide) hexane; diisopropylbenzene monohydroperoxide; paramenthane hydroperoxide.

Other initiators include hydrazines, polysulphides, azo compounds, for example azobisisobutyronitrile, metal iodides, and metal alkyls, benzoins, benzoin ethers such as benzoin alkyl ethers and benzoin aryl ethers, acetophenones, Benzil, benzil ketals, such as benzil dialkyl ketal, anthraquinones such as 2-alkylanthraquinones, 1-chloroanthraquinones and 2-amylanthraquinone, triphenylphosphine, benzoylphosphine oxides, benzophenones, thioxanones, xanthones, acridine derivatives, phenzine derivatives, quinoxaline derivatives, phenylketones such as 1-aminophenylketones and 1-hydroxyphenylketones such as 1-hydroxycyclohexylphenyl ketone and triazine compounds.

The monomer and initiator may be premixed and introduced into the plasma, preferably in the form of a monomer and initiator gaseous mixture or preferably in the form of a mixed atomised liquid. Alternatively they may be introduced into a plasma chamber separately at an appropriate rate. Preferably the monomer and initiator are premixed.

The substrate to be coated may comprise any material, for example metal, ceramic, plastics, siloxane, woven or non-woven fibres, natural fibres, synthetic fibres cellulosic material and powder. Most preferably in the case of this invention the preferred substrate is a plastic material, for example thermoplastics such as polyolefins e.g. polyethylene, and polypropylene, polycarbonates, polyurethanes, polyvinylchloride, polyesters (for example polyalkylene terephthalates, particularly polyethylene terephthalate), polymethacrylates (for example polymethylmethacrylate and polymers of hydroxyethylmethacrylate), polyepoxides, polysulphones, polyphenylenes, polyetherketones, polyimides, polyamides, polystyrenes, phenolic, epoxy and melamine-formaldehyde resins, and blends and copolymers thereof.

Substrates coated by the deposition method of the present invention may have various properties and/or applications such as for example barrier properties, the enhancement of hydrophilic and hydrophobic coatings such as hydrophilic, biocompatible, anti-fouling and controlled surface pH applications of substrates. Controlled surface pH applications will include filtration (both gas and liquid) and separations media. The substrates may also be utilised to trap or encapsulate active materials. Alternative applications include the enhancement of the ability of additional materials to adhere to the substrate surface; the improvements in hydrophobicity, oleophobicity, fuel and soil resistance, and/or the release properties of the substrate; improvements in water resistance and enhancement of the softness of fabrics; furthermore the inclusion of colloidal metal species in the coatings may provide surface conductivity to the substrate, or enhance its optical properties The invention will be more clearly understood by reference to the following example with Reference to the figures in which:—

FIG. 1 is a general view of a plasma generating unit as used in the Examples hereinbelow

EXAMPLE 1

Retention of Acid Functionality in Polyacrylic Acid Deposition on to a Polypropylene Film Using a Dichlorobenzoyl Peroxide Initiator Three liquid coating forming material compositions were prepared comprising acrylic acid (AA) and 0, 0.6 and 3% by weight of a 2,4, dichlorobenzoyl peroxide, 50% paste in polydimethylsiloxane fluid (DCBP) sold as Perkadox® PD 50S-ps-a by Akzo Nobel Chemicals Inc.

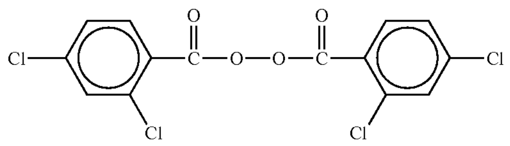

dichlorobenzoyl peroxide

The compositions were used to form polyacrylic acid coatings on a polypropylene film being passed through an atmospheric pressure glow discharge plasma unit of the type described in the applicants co-pending patent application WO 03/086031 and as shown in FIG. 1 herein.

Referring now to FIG. 1, the flexible polypropylene and polyester fabric substrate was transported through the plasma assembly by means of guide rollers 70, 71 and 72. A helium process gas inlet 75, an assembly lid 76 and an atomiser such as an ultrasonic nozzle 74 for introducing atomised liquid coating forming material compositions into plasma region 60 are provided. Total plasma power applied to both plasma regions was 0.6 kW.

In use, a 100 mm wide web of flexible substrate was transported through the plasma assembly at a speed of speed of 4 m $min^{-1}$. The substrate was initially directed to and over guide roller 70 through plasma region 25 between electrodes 20*a* and 26. The plasma generated between electrodes 20*a* and 26 in plasma region 25 was utilised as a cleaning helium plasma, i.e. no liquid coating forming material compositions was directed into plasma region 25. Helium was introduced into the system by way of inlet 75. Lid 76 is placed over the top of the system to prevent the escape of helium, as it is lighter than air. Upon leaving plasma region 25 the plasma cleaned substrate passes over guide 71 and is directed down through plasma region 60, between electrodes 26 and 20*b* and over roller 72. Plasma region 60 however is utilised to coat the substrate with a polyacrylic acid coating derived from the atomised liquid coating forming material compositions referred to above and introduced into plasma region 60 through ultrasonic nozzle 74 at a rate of 50 $\mu Lmin^{-1}$.

Each atomised liquid coating forming material composition is plasma treated when passing through plasma region 60 generating a series of free radicals species arising from both the DCBP initiator (when present) and the plasma. These free radicals undergo polymerisation reactions and deposit onto the substrate to form a coating on the substrate as it passes through plasma region 60. The resulting coated substrate is then transported over roller 72 and is collected or further treated with additional plasma treatments. Rollers 70 and 72 may be reels as opposed to rollers.

XPS Analysis

A Kratos Axis Ultra electron spectrometer equipped with an Al Kα X-ray source, and a concentric hemispherical analyser was used for XPS analysis of the resulting coated substrate. Photo-emitted electrons were collected at a take-off angle of 90° from the substrate surface. XPS spectra were accumulated on an interfaced PC computer and fitted using a Simplex minimisation algorithm with mixed Gaussian: Lorentzian peaks having variable full-width-at-half-maximum (FWHM), with binding energy values constrained. Instrument sensitivity factors using Kratos library was taken as C(1s):O(1s) equals 0.278:0.78.

Using XPS analysis, the relative concentration of oxygen on the substrate surface was found to increase in the presence of a polyacrylic acid coating as might be expected but surprisingly further increases in Oxygen concentration were observed in the coatings resulting from the liquid coating forming material compositions comprising acrylic acid and DCBP. The use of a higher concentration of initiator led to an additional increase in oxygen concentration, as shown in Table 1 which compares the relative concentrations of oxygen with respect to polyacrylic acid coatings derived the different liquid coating forming material compositions.

TABLE 1

| Monomer mixture used in coating process | Relative Concentration (%) on substrate or coating surface (after application of coating) Oxygen | Carbon |
|---|---|---|
| Polypropylene | 0.4 | 99.6 |
| AAc (acrylic acid) | 20.6 | 73.4 |
| AAc/0.6% DCBP | 25.5 | 74.5 |
| AAc/3% DCBP | 29.2 | 70.8 |

XPS Curve-fitting of the carbon (C 1s) core level provided information about the chemical nature of the deposit by comparison to the curve-fit for conventionally polymerised acrylic acid.

For a plasma polymerised polyacrylic acid (ppPAAc) deposit prepared without the addition of an initiator using a 0.6 kW deposition power, the carbon (C 1s) core level shape was similar to that for conventionally polymerised acrylic acid (PAAc) although the peak associated with $CO_2X$ was lower in intensity than would be expected. By constraining the areas of the peaks related with PAAc, to the intensity of the $CO_2X$ peak, it became apparent that three additional peaks associated with the substrate were required: C—C (sub), C—OX, and C═O, Some minor oxidation of the acrylic acid based precursor was noted by the increased intensity of the C—OX peak, compared with its intensity on plasma treated polypropylene (5%).

Addition of the initiator at a 0.6% level (10 g acrylic acid/0.062 g DCBP) led to an increase in the size of the carboxylic acid peak.

A further increase in $CO_2X$ peak intensity was observed on the addition of a higher concentration of initiator of 3% by weight (11.5 g acrylic acid/0.358 g DCBP).

The relative concentrations of the functional groups making up the deposited ppAAc layer are presented in Table 2. The increase in concentration of the carboxylic function with increasing concentration of peroxide initiator is clearly seen. This indicates an increase in deposit thickness, i.e. an enhanced deposition rate by the addition of initiator. It was possible to estimate the thickness of the deposit using Hill's equation (J M Hill et al., Chem. Phys. Lett., 1976, 44, 225) by comparing the intensity of the $CO_2X$ peak with the intensity of the synthetic peak related to C—C (sub).

TABLE 2

Relative concentration of functional groups in deposits prepared from APPLD of acrylic acid and DCBP peroxide

| Coating Composition | Relative Concentration (%) C—C | C—C=O | X—O—C=O | C—C (sub) | C—OX | C=O | Coating Thickness (nm) |
|---|---|---|---|---|---|---|---|
| Conventionally polymerised PAAc | 39.4 | 30.3 | 30.3 | 0.0 | 0.0 | 0.0 | >8 |
| AAc | 11.0 | 10.2 | 10.2 | 60.0 | 5.6 | 2.9 | 0.5 |
| AAc/0.6% DCBP | 17.0 | 14.8 | 14.8 | 43.1 | 7.4 | 2.9 | 0.9 |
| AAc/3% DCBP | 22.4 | 18.7 | 18.7 | 29.5 | 9.5 | 1.2 | 1.4 |

EXAMPLE 2

Retention of Acid Functionality in Polyacrylic Acid Deposition on to a Polypropylene Film Using a Diphenylethanedione Initiator The process described in example 1 was repeated using an alternative initiator, diphenylethanedione (DPE), sold under the name Benzil by Sigma-Aldrich company Ltd, Dorset, UK)

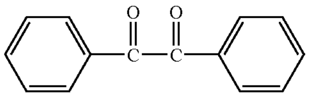

diphenylethanedione

The addition of DPE initiator also led to noticeable improvements in the deposition of plasma polymerised acrylic acid as shown in Table 3. In this case, concentrations of 0.5, 1.0, and 2.5% were compared to deposition with no initiator.

TABLE 3

| | Relative concentration (%) F | O | N | C | X—O—C=O % |
|---|---|---|---|---|---|
| As received PP film | — | 0.7 | — | 99.3 | — |
| AA | 0.6 | 24.9 | 1.5 | 73.1 | 15.1 |
| AA/0.5% by weight Benzil | — | 29.3 | 1.3 | 69.4 | 18.8 |
| AA/1.5% by weight Benzil | — | 30.2 | — | 69.8 | 18.4 |
| AA/2.5% by weight Benzil | 0.8 | 29.0 | — | 70.2 | 18.9 |

In the case of Example 2, Contact angle analysis was additionally undertaken in order to assess the variation in hydrophilicity of resulting polyacrylic acid films prepared in accordance with the present invention.

Contact Angle Analysis

Contact angle analysis was undertaken using a CAM 20 Optical Contact Angle Meter apparatus (KSV Instruments LTD) which comprises a movable stage, an automated syringe and an optical device for recording images of the drops. A 2 μl drop of HPLC grade water was deposited on each sample and an image of the droplet was recorded 30 seconds after deposition. The contact angles of both sides of the drop were determined. In the results provided in Table 4 below, it should be appreciated that the lower the water contact angle, the more hydrophilic the deposited coating.

TABLE 4

| Substrate/Source of polyacrylic acid coating | Water Contact angle (°) |
|---|---|
| Polypropylene | 99 |
| AAc | 45.8 |
| AAc/0.5% by weight Benzil | 19.0 |
| AAc/1.5% by weight Benzil | 17.2 |
| AAc/2.5% by weight Benzil | 19.7 |

The water contact angle decreased from 99° for an untreated substrate, to 46° for a substrate having a polyacrylic acid coating derived from an initiator-free acrylic acid composition, however a very significant change is identified in the presence of the DPE initiator whereby the angle drops to approximately 18° for each concentration showing a significant improvement in hydrophilicity. It will be noted that the latter value is similar to the value of water contact angle on conventionally polymerised polyacrylic acid of 15°.

Gas Phase Derivatisation (GPD)

Further analysis of the resulting coating was undertaken using GPD as described in Chilkoti, A.; Ratner, B. D.; Briggs, D., *Chem. Mater.,* 3, 1991, 51-61 and further developed by Alexander et al., Alexander, M. R.; Wright, P. V.; Ratner, B. D., *Surf. Interface Anal.,* 24, 1996, 217-220 and Alexander, M. R.; Duc, T. M., *J. Mater. Chem.,* 8(4), 1998, 937-943. GPD is frequently used to obtain unambiguous information about the chemical environment of modified polymer surfaces. In the present case trifluoroethanol derivatisation was utilised as a means of determining the retention of the carboxylic acid functional groups in the polymer coating. The coating applied by the method in accordance with the present invention was then derivatised with trifluoroethanol to distinguish between carboxylic acid and carboxylic ester functionalities by the mechanism in Scheme 1 below:

Scheme 1: Trifluoroethanol reaction with carboxylic acid functionalities

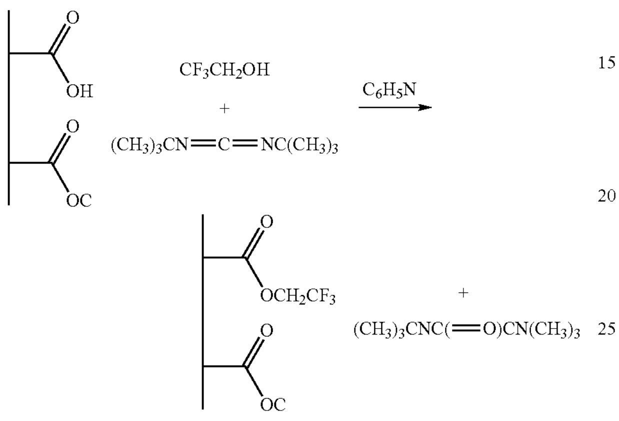

Subsequent to GPD the resulting derivatised coating was analysed by XPS to determine the retention of the carboxylic acid functional groups in the plasma polymerised polyacrylic acid coatings. A comparison of the ratio of COOH:COOC is provided in Table 5.

TABLE 5

Relative concentration of COOX retention of carboxylic acid

| | Concentration (%) | | % Retention of | Coating Thickness |
|---|---|---|---|---|
| | COOH | COOX | COOh | (nm) |
| polyacrylic acid (conventionally prepared) | 17.1 | 19.4 | 88 | >8 nm |
| ppAAc | 6.4 | 10.0 | 64 | 0.9 |
| ppAAc + 0.5% benzil | 6.7 | 8.7 | 77 | 1.3 |
| ppAAc + 1.5% benzil | 8.8 | 11.4 | 77 | 1.3 |
| ppAAc + 2.5% benzil | 8.4 | 10.6 | 79 | 1.3 |

As expected, conventionally polymerised polyacrylic acid has the highest concentration of COOH retained in the coating (88%). The plasma polymerised acrylic acid containing no benzil coating was seen to have 64% retention; indicating 36% of the acid groups have been crosslinked to form carboxylic esters. The retention of carboxylic acid increased with the use of initiator to 77%.

These results are in good agreement with previous observations from water contact angle measurements and deposition rate, as shown by film thickness measurements.

The invention claimed is:

1. A method for forming a polymeric coating on a substrate surface, which method comprises the steps of i. plasma treating a mixture comprising a free radical initiator and a free-radical initiated polymerisable monomer having one or more free-radical polymerisable groups with a soft ionisation plasma process to form the polymeric coating characterized in that the monomer and initiator are either premixed and introduced into the plasma, in the form of a monomer and initiator gaseous mixture or a mixed atomized liquid, or the monomer and initiator are introduced into a plasma chamber separately; and ii. depositing the polymeric coating formed during step (i) onto a substrate surface.

2. A method in accordance with claim 1 wherein each monomer comprises at least one unsaturated group.

3. A method in accordance with claim 1 wherein the monomer comprises one or more functional groups selected from alcoholic groups, carboxylic acid groups, carboxylic acid derivative groups, acrylate groups, alkylacrylate groups, primary secondary or tertiary amino groups, alkyl halide groups, carbamate groups, urethane groups, glycidyl groups, epoxy groups, glycol groups, polyglycol groups, organic salts, organic groups containing boron atoms, phosphorus atoms, and sulphur atoms, grafted or covalently bonded biochemical groups, and grafted or covalently bonded biochemical species.

4. A method in accordance with claim 1 wherein the monomer is selected from one or more of acrylic acid, alkylacrylic acid, fumaric acid, maleic acid, maleic anhydride, citraconic acid, cinnamic acid, itaconic acid, vinylphosphonic acid, sorbic acid, mesaconic acid, citric acid, succinic acid, ethylenediamine tetracetic acid (EDTA) and ascorbic acid and their derivatives; allyl amine, 2-aminoethylene, 3-aminopropylene, 4-aminobutylene, 5-aminopentylene, acrylonitrile, methacrylonitrile, acrylamide, alkylacrylamide, epoxy compounds, butadiene monoxide, 2-propene-1-ol, 3-allyloxy-1, 2,-propanediol, vinylcyclohexene oxide, dimethylvinylphosphonate, diethyl allyl phosphate, diethyl allylphosphonate, vinyl sulphonic acid, phenylvinylsulphonate, vinylsulphone, alkyl methacrylates, glycidyl methacrylate, trimethoxysilyl propyl methacrylate, allyl methacrylate, hydroxyethyl methacrylate, hydroxypropyl methacrylate, dialkylaminoalkyl methacrylates, fluoroalkyl methacrylates, fluoroalkyl acrylates, styrene, α-methylstyrene, and halogenated alkenes.

5. A method in accordance with claim 1 wherein the substrate is selected from metals, ceramics, plastics, siloxanes, woven or non-woven fibres, natural fibres, synthetic fibres, cellulosic materials, and powder.

6. A method in accordance with claim 1 wherein the initiator is selected from the group of diacyl peroxides, peroxydicarbonates, monoperoxycarbonates, peroxyketals, peroxyesters, dialkyl peroxides, hydroperoxides, hydrazines, polysulphides, azo compounds, metal iodides, and metal alkyls.

7. A method in accordance with claim 1 wherein the initiator is selected from the group of benzoins, benzoin ethers, acetophenones, Benzil, benzil ketals, anthraquinones, 1-chloroanthraquinones, 2-amylanthraquinone, triphenylphosphine, benzoylphosphine oxides, benzophenones, thioxanones, xanthones, acridine derivatives, phenzine derivatives, quinoxaline derivatives, phenylketones, 1-aminophenylketones, 1-hydroxyphenylketones, 1-hydroxycyclohexylphenyl ketone, and triazine compounds.

8. A method in accordance with claim 1 wherein a plasma source used in the soft ionization plasma process is selected from the group of non-thermal equilibrium plasma sources, microwave plasma sources, corona discharge sources, arc plasmas sources, DC magnetron discharge sources, helicon discharge sources, capacitatively coupled radio frequency (rf) discharge sources, inductively coupled rf discharge sources, low pressure pulsed plasma sources and/or resonant microwave discharge sources.

9. A method in accordance with claim 8 wherein the plasma is generated by a non-thermal equilibrium plasma selected from the group of atmospheric pressure glow discharge, dielectric barrier discharge (DBD), low pressure glow discharge, plasma jet, plasma knife and post discharge plasma.

10. A method in accordance with claim 1 wherein the monomer and initiator are premixed and introduced into the plasma in a single mixture.

11. A coated substrate prepared by the method of claim 1.

12. A method in accordance with claim 1 characterised in that the free radical initiator and the monomer are separately plasma treated.

* * * * *